United States Patent
Suzuki

[11] Patent Number: 5,428,260
[45] Date of Patent: Jun. 27, 1995

[54] VIBRATION DRIVEN MOTOR

[75] Inventor: Ryuji Suzuki, Kawasaki, Japan

[73] Assignee: Canon Kabushiki Kaisha, Tokyo, Japan

[21] Appl. No.: 34,182

[22] Filed: Mar. 18, 1993

Related U.S. Application Data

[63] Continuation of Ser. No. 739,493, Aug. 2, 1991, abandoned.

[30] Foreign Application Priority Data

| Aug. 3, 1990 | [JP] | Japan | 2-206244 |
| Aug. 6, 1990 | [JP] | Japan | 2-207762 |
| Aug. 6, 1990 | [JP] | Japan | 2-207763 |
| Aug. 6, 1990 | [JP] | Japan | 2-207764 |
| Jan. 11, 1991 | [JP] | Japan | 3-002091 |

[51] Int. Cl.$^6$ ............................ H01L 41/08
[52] U.S. Cl. ..................................... 310/323
[58] Field of Search .......................... 310/323, 328

[56] References Cited

U.S. PATENT DOCUMENTS

| 4,562,374 | 12/1985 | Sashida | 310/328 |
| 4,613,782 | 9/1986 | Mori et al. | 310/323 |
| 4,663,556 | 5/1987 | Kumada | 310/323 X |
| 4,705,980 | 11/1987 | Mishiro | 310/323 |
| 4,893,046 | 1/1990 | Honda | 310/323 |
| 4,893,047 | 1/1990 | Honda | 310/323 |
| 4,894,578 | 1/1990 | Honda | 310/323 |
| 4,945,275 | 7/1990 | Honda | 310/323 |
| 4,975,614 | 12/1990 | Honda | 310/323 |
| 5,039,899 | 8/1991 | Yamaguchi | 310/323 |
| 5,053,670 | 10/1991 | Kosugi | 310/323 X |

FOREIGN PATENT DOCUMENTS 297281 4/1990 Japan.

Primary Examiner—Mark O. Budd
Attorney, Agent, or Firm—Fitzpatrick, Cella, Harper & Scinto

[57] ABSTRACT

In a vibration driven motor, a rotatable member is brought into frictional contact with a vibration member having an electro-mechanical energy conversion element and by the application of an AC electric field to the electro-mechanical energy conversion element, a driving vibration is excited in the vibration member to drive the rotatable member; a rotation output member is provided for frictionally contacting the rotatable member to deliver an output, and the frictional force between the rotatable member and the rotation output member is set to a value smaller than the frictional force between the vibration member and the rotatable member.

11 Claims, 7 Drawing Sheets

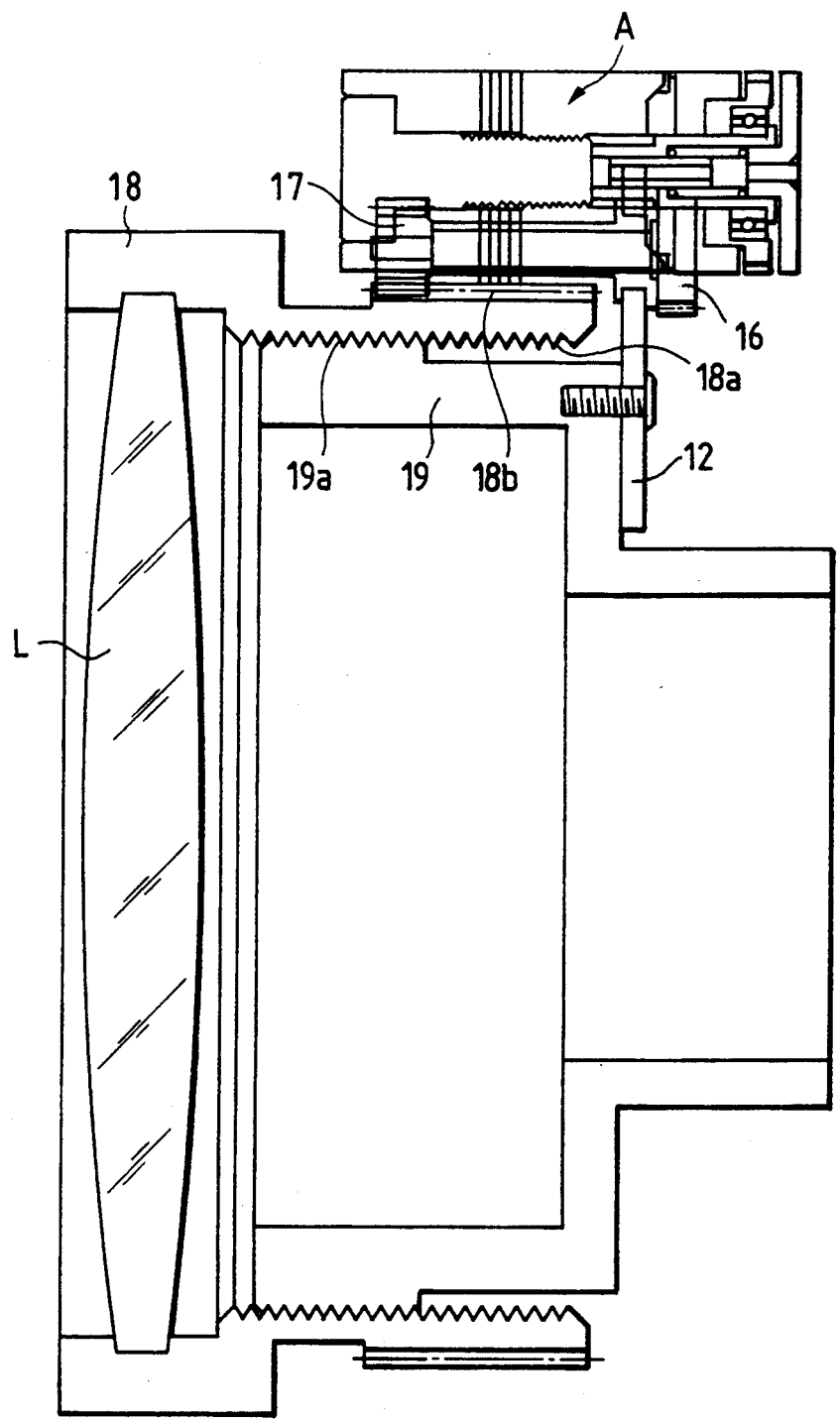

VIBRATION DRIVEN MOTOR

This application is a continuation of application Ser. No. 07/739,493 filed Aug. 2, 1991 now abandoned.

BACKGROUND OF THE INVENTION

1. Field of the Invention

This invention relates to an ultrasonic motor (hereinafter also referred to as a vibration driven motor) endowed with the friction clutch function.

2. Related Background Art

In recent years, a vibration driven motor or a so-called bar-like vibration driven motor in which electrical signals differing in phase from each other are applied, for example, to piezoelectric elements as electro-mechanical energy conversion elements to thereby generate a plurality of bending vibrations differing in phase in time in different planes of a vibration member, whereby circular or elliptical motion is excited in the surface of the vibration member of a metal or the like to cause relative movement between a member (e.g. a rotor) in contact with said surface and said vibration member has been proposed, for example, in U.S. Pat. No. 4,562,374.

In this bar-like vibration driven motor, the vibration member and the rotor cannot be disposed so as to surround, for example, the photo-taking lens of a camera as in a well-known ring-like vibration driven motor. Therefore, it is unavoidable to adopt a construction in which the rotational force of the rotor is transmitted to a driven member, for example, a focusing lens through a transmission mechanism such as a gear.

However, where the driven member (for example, the lens) is driven through the transmission mechanism such as a gear with the bar-like ultrasonic motor as a drive source, if a high load is applied to a rotation output member such as a gear for transmitting the rotational force of the rotor to the driven member, the rotation of the rotor becomes unstable. In the worst case, the vibration member of the motor deviates from its resonant state and the rotation of the rotor stops. This has led to the problem that, although the vibration member is being excited, the rotor stops at that location, thereby causing the creation of sounds (noises) or the creation of abnormal abrasion between the stator (vibration member) and the rotor.

So, in order to solve such a problem, in Japanese Laid-Open Patent Application No. 2-97281, design is made such that if a high load is applied, the rotor is idly rotated. However, in this system, it is necessary to newly provide a friction plate between the rotor and the output shaft, and this could not be said to be effective in respect of space and cost.

SUMMARY OF THE INVENTION

It is an object of the present invention to solve such a problem peculiar to the prior art and to provide an ultrasonic motor in which the creation of abnormal abrasion and abnormal sound between a rotor and a stator can be prevented even if a high load is applied from the outside to a driving system.

It is another object of the present invention to provide, in addition to the above object, an ultrasonic motor which can be made compact.

Other objects of the present invention will become apparent from the following detailed description of the invention.

One aspect of the present invention is that a rotatable member is brought into frictional contact with a vibration member having an electro-mechanical energy conversion element and by the application of an AC electric field to the electro-mechanical energy conversion element. A driving vibration is excited in the vibration member to drive the rotatable member. A rotation output member provided for frictionally contacting the rotatable member to deliver an output, and the frictional force between the rotatable member and the rotation output member set to a value smaller than the frictional force between the vibration member and the rotatable member.

BRIEF DESCRIPTION OF THE DRAWINGS

FIG. 5 is a cross-sectional view of an apparatus for driving the lens barrel shown in FIG. 4.

DESCRIPTION OF THE PREFERRED EMBODIMENTS

Figure 1A:
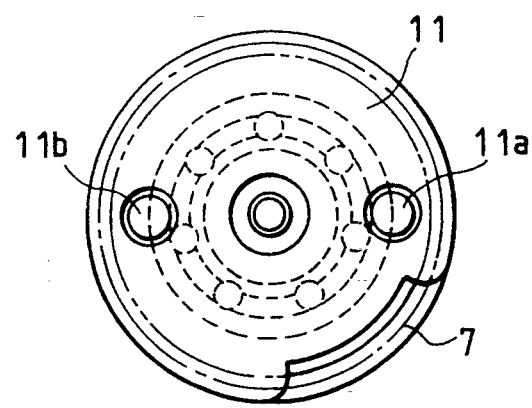
FIGS. 1A and 1B are a plan view and a cross-sectional view, respectively, showing an embodiment of a vibration driven motor according to the present invention.

The present invention will hereinafter be described in detail with respect to some embodiments thereof shown in the drawings.

Figure 1B:
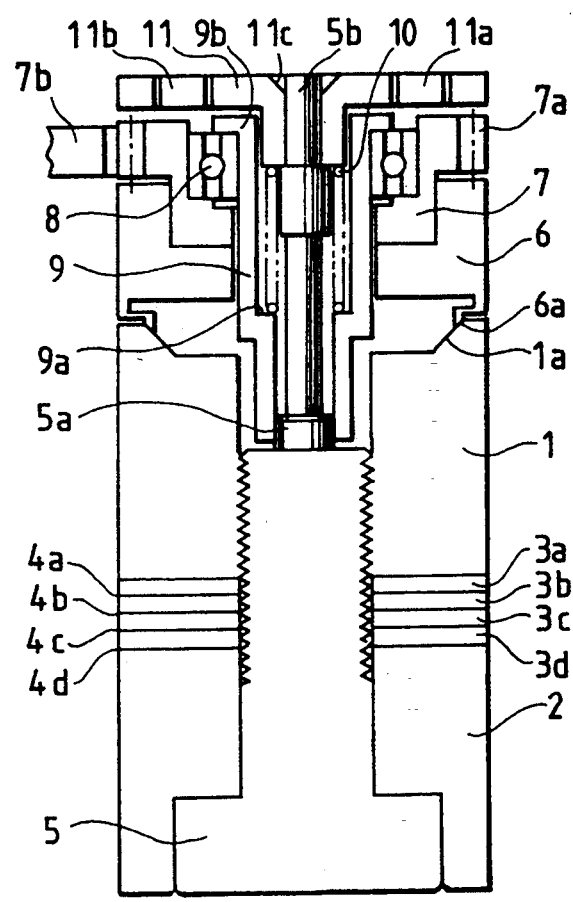

FIG. 1 shows an embodiment of a vibration driven motor according to the present invention, FIG. 1A being a plan view thereof, and FIG. 1B being a vertical cross-sectional view thereof.

The reference numeral 1 designates a pillar-shaped vibratory resilient member formed of a metallic material, the reference numeral 2 denotes a keep member formed of a metallic material and having an outer diameter similar in shape to the outer diameter of the vibratory resilient member 1, the reference characters 3a–3d designate circular ring-shaped piezoelectric elements as electro-mechanical energy conversion elements formed with an outer diameter equal to the outer diameter of the vibratory resilient member 1, and the reference characters 4a–4d denote the electrode plates of the piezoelectric elements 3a–3d. The electrode plates 4a–4d and the piezoelectric elements 3a–3d are disposed between the vibratory resilient member 1 and the keep member 2, and a bolt 5 is threadably engaged with the vibratory resilient member 1 through the keep member 2, whereby these are fixed as a unit and constitute the stator of the vibration driven motor A.

The vibration driven motor A is such that AC voltages differing in electrical phase are applied from a power source circuit, not shown, to the electrode plates 4a–4d of the stator, whereby the piezoelectric elements 3a–3d form two-direction bending vibrations in the different planes of the stator and differing in phase in time in the stator, and a motion like rope skipping is excited in the stator by a combination of these bending vibrations, whereby a rotor 6 to be described which is in frictional contact with the fore end portion of the stator is frictionally driven. The rotor 6 has its rear end portion (frictional contact portion) 6a bearing the tapered portion 1a of the vibratory resilient member 1, and obtains an appropriate frictional force by the pressing provided by a pressing spring 10 which will be described later.

The reference numeral 7 designates a rotation output member of a friction stabilizing material having a gear 7a and is friction-coupled between the rear end surface thereof and the end surface of the rotor 6. The gear 7a is for transmitting the rotation of the rotor 6 to the outside, for example, the photo-taking lens driving mechanism 7b of a camera.

The frictional force of the friction coupling between the rotor 6 and the rotation output member 7 is created by the pressing spring 10, and that force is set so as to be smaller than the frictional force between the vibratory resilient member 1 and the rotor 6 (that is, the coefficient of friction between the rotor 6 and the member 7 may be smaller than that between the resilient member 1 and the rotor 6).

That is, even if a rotational force is given from the outside to the rotation output member 7, the rotor 6 will not rotate but only the rotation output member 7 will rotate because the forcibly frictional force to the stator is greater than the frictional force to the rotation output member 7.

On the other hand, a bearing 8 is provided in the bore portion of the rotation output member 7, and a hollow shaft 9 is fitted into the bore portion of the bearing 8 to thereby make the rotor 6 and the rotation output member 7 rotatable.

The shaft 9 is fitted in the sliding portion 5a of the bolt 5 to thereby make the sliding portion coincident with the axis of the stator.

The pressing spring 10 is designed to press the stepped portion 9a of the shaft 9 to thereby press the bearing 8 by the flange portion 9b of the shaft 9 and create a frictional force between the vibratory resilient member 1 and the rotor 6 and between the rotor 6 and the rotation output member 7 by that pressing force.

The pressing force of the pressing spring 10 is produced by a well-known method of inserting the hole portion of a planar holding member 11 onto a pin portion 5b formed on the tip end portion of the bolt 5, and adhesively securing, for example, the hole portion 11c to the pin portion 5b.

This vibration driven motor A is fixed by fixing the holding member 11 to a fixed member, not shown, by screws, not shown, through screw holes 11a and 11b.

When supporting the stator of the vibration driven motor, it is necessary to prevent the vibration excited by the stator from being affected. The end of the stator is the antinode position of the vibration and at that end, there is only displacement in the diametrical direction and moreover this displacement is actually minute and therefore, by fixing the pin portion 5b which is one end of the stator, the vibration of the stator is prevented from being affected.

In the thus constructed vibration driven motor, when a high load is applied to the rotation output member 7, the rotor 6 begins to slide relative to the rotation output member 7 before the rotation of the rotor 6 becomes unstable or stops, and the high load from the rotation output member 7 is not transmitted between the rotor 6 and the stator.

To establish the operation as described above, the choice of the materials of the vibratory resilient member 1, the rotor 6 and the rotation output member 7 becomes a subject, and when a combination of brass for the vibratory resilient member 1 and aluminum for the rotor 6 was used and the coefficient of friction therebetween was 0.8 or more and polyacetal was used for the rotation output member 7 and the coefficient of friction between the rotor 6 and the member 7 was 0.2 or less and the above-described operation was performed, it was confirmed that the motor operates well. It was also confirmed that these materials are not restrictive and if there is a difference in coefficient of friction about four times as great, the rotor 6 and the rotation output member 7 slide positively before the vibratory resilient member 1 and the rotor 6 slide.

As shown, the vibratory resilient member 1, the rotor 6 and the rotation output member 7 are formed with substantially the same diameter, and the holding member 11 is constructed so as to be substantially equal to or larger in diameter than the vibratory resilient member 1, the rotor 6 and the rotation output member 7, and these are integrally assembled into a unit.

Figure 2:
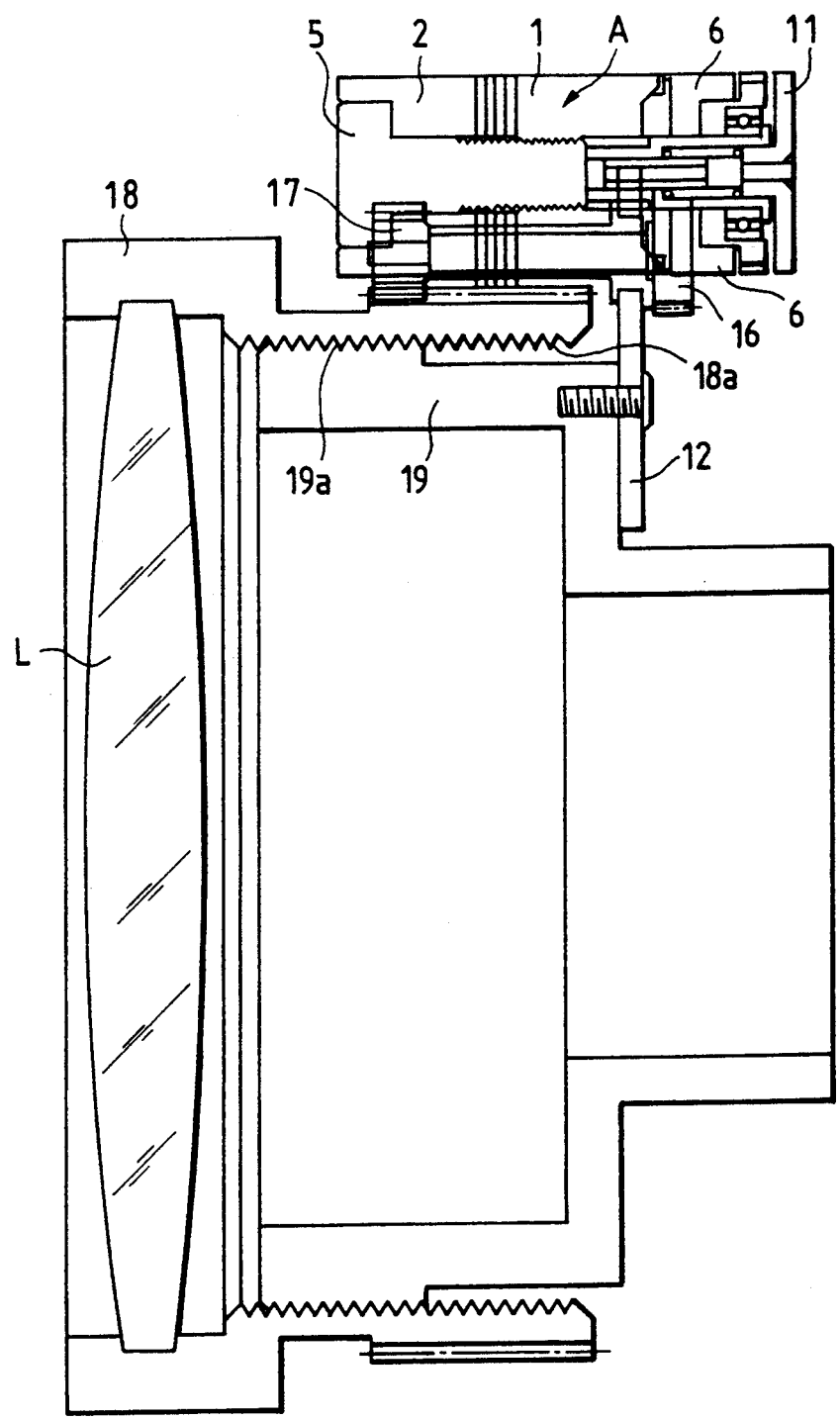
FIG. 2 is a cross-sectional view of an embodiment in which the motor of the present invention is applied for the driving of the lens barrel of a camera.
Figure 3:
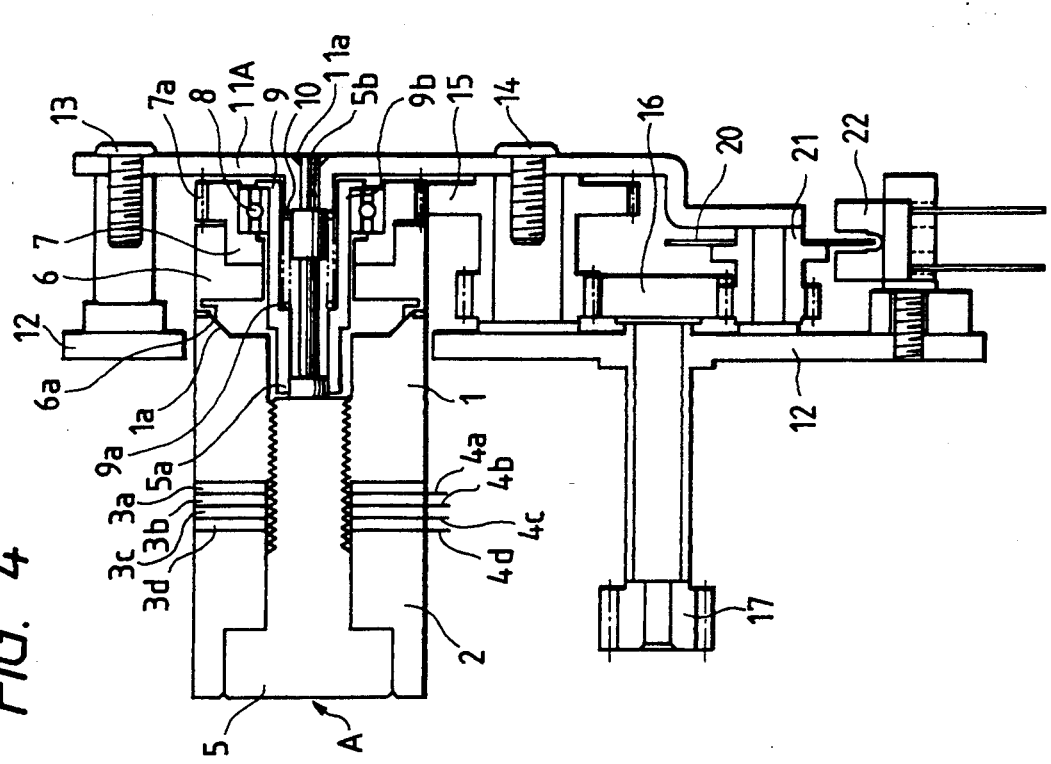
FIG. 3 is a cross-sectional view of a transmission mechanism in the embodiment of FIG. 2.

FIG. 2 is a cross-sectional view showing an embodiment in which the motor according to the present invention is applied to the lens barrel of a camera, and FIG. 3 shows the transmission mechanism thereof.

The reference numerals 15, 16 and 17 designate gears for transmitting the rotation of the rotation output member 7. These gears are arranged as shown, and the gear 15 has one end portion of its rotary shaft supported on a motor ground plate 12 and has the other end portion supported by a screw 14 threadably engaged with the hole portion of the holding member 11. The gear 17 is fixed to the rotary shaft of the gear 16 to transmit the output of the vibration driven motor to the rotatable cylinder 18 of the lens barrel. The reference numeral 21 denotes a gear to which a pulse plate 20 is secured and which meshes with the gear 16. The pulse of the pulse plate 20 may be read by a photocoupler 22, whereby for example, the movement, the position, etc. of the rotatable cylinder 18 which is a driven member rotatively driven by the gear 17 can be detected.

In this lens barrel, the helicoid thread portion 18a of the rotatable cylinder 18 having a lens L for effecting focusing or zooming is helicoid-coupled to a helicoid thread portion 19a provided on a fixed cylinder 19. By this rotatable cylinder 18 being moved along the direction of the optical axis while being rotated, the focusing or zooming operation is performed, and for the driving of the motor, the gear 17 is in meshing engagement with a gear portion 18b provided on the rotatable cylinder 18. The motor ground plate 12 is fixed to the fixed cylinder 19.

As regards the operation of an apparatus for driving the thus constructed lens barrel, in response to a lens driving signal from a driving circuit, not shown, which is provided, for example, in a camera, not shown, AC voltages are applied to the electrode plates 4a–4d of the motor A, whereby as previously described, the rotor 6 is rotated in a predetermined direction (the direction of rotation is determined by reversing, for example, the advance of the phases of the applied two AC voltages differing in phase from each other). By the rotation of the rotor 6, the rotation output member 7 which is frictionally coupled to the rotor 6 is also rotated, and the rotation output thereof is transmitted through the gear 15, the gear 16 and the gear 17 to rotate the rotatable cylinder 18. The rotatable cylinder moves forward or backward while being rotated to thereby accomplish focusing or zooming, and at the same time, the lens position or lens movement information is output from the photocoupler 22.

On the other hand, if a rotational force is imparted from the outside to the rotatable cylinder 18 when the vibration driven motor is inoperative, the gear 17 is rotated and thus, the gear 16 and the gear 15 are also rotated, and the rotation output member 7 is also rotated.

However, since as previously described, the frictional force between the rotation output member 7 and the rotor 6 is set to a value smaller than the frictional force between the stator and the rotor 6, the rotor 6 is not rotated and the rotation output member 7 slides and rotates with respect to the rotor 7.

Figure 4:
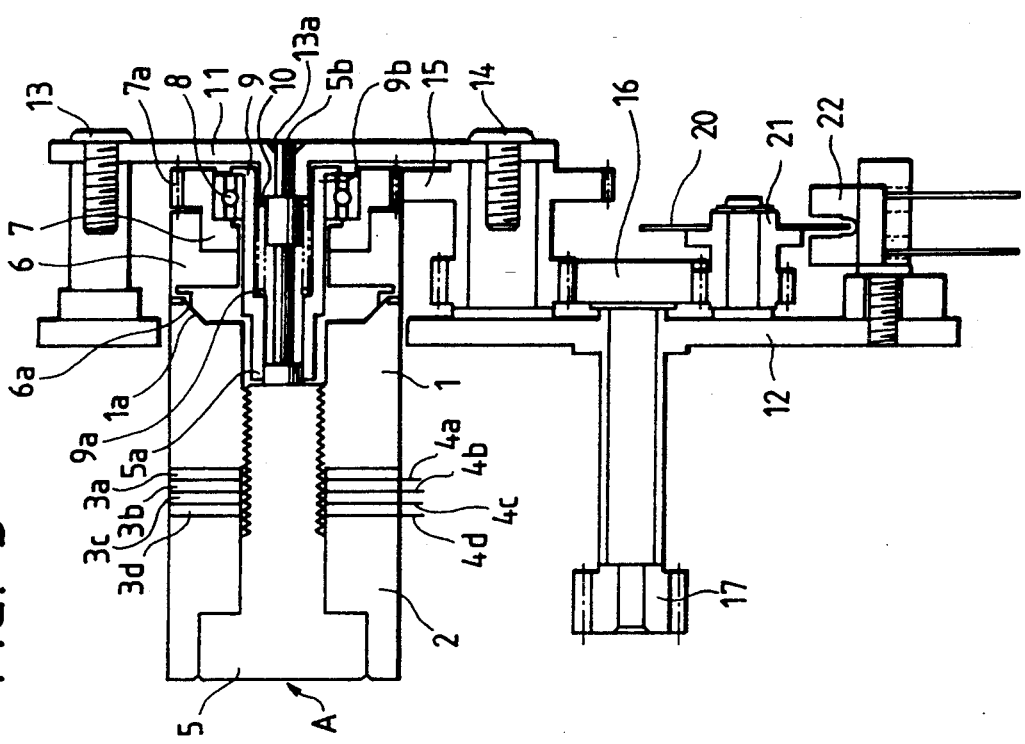
FIG. 4 is a cross-sectional view of another embodiment of the present invention.

FIG. 4 shows another embodiment of the present invention in which a holding member is used also as the thrust receiver of a member constituting a transmission mechanism.

A vibration driven motor A similar in construction to the aforedescribed vibration driven motor is fixed by a holding member 11A being secured to a motor ground plate 12 which is a fixed member by screws 13 and 14, while this holding member 11A serves also as the thrust receiver of the gears 15 and 21 of a transmission mechanism which will be described later.

FIG. 5 is a cross-sectional view of an apparatus for driving a lens barrel by the use of the vibration driven motor shown in FIG. 4.

In this lens barrel, the helicoid thread portion 18a of a rotatable cylinder 18 having a lens L for effecting focusing or zooming is helicoid-coupled to a helicoid thread portion 19a provided on a fixed cylinder 19. By this rotatable cylinder 18 moving along the direction of the optical axis while being rotated, the focusing or zooming operation is performed, and the gear 17 of the motor driving apparatus is in meshing engagement with a gear portion 18b provided on the rotatable cylinder 18. The motor ground plate 12 is fixed to the fixed cylinder 19. Thus, the photocoupler 22 detects the movement and position of the lens.

Figure 6A:
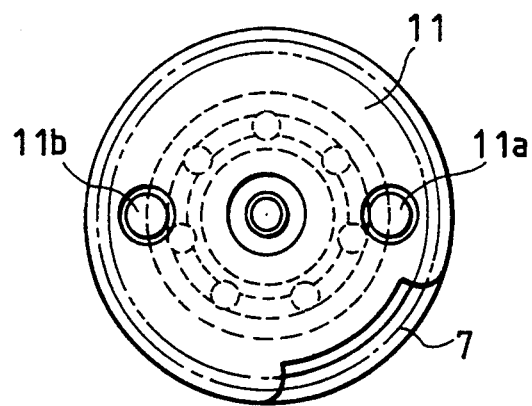
FIG. 6A is a plan view of another embodiment of the present invention.
Figure 6B:
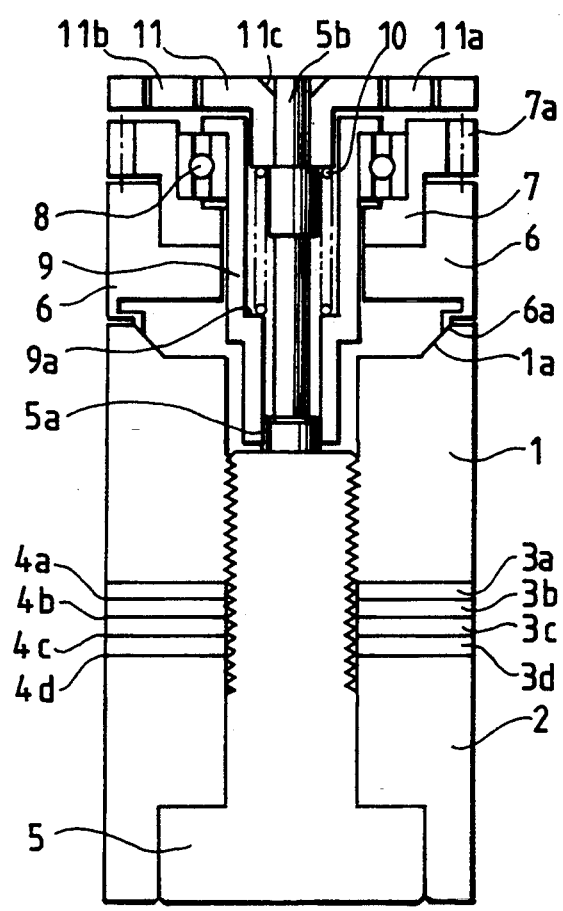
FIG. 6B is a cross-sectional view of the motor shown in FIG. 6A.

FIG. 6 shows an embodiment of the vibration driven motor according to the present invention, FIG. 6A being a plan view thereof, and FIG. 6B being a vertical cross-sectional view thereof. Elements functionally similar to those shown in the above-described embodiments are given similar reference characters and need not be described.

In the present embodiment, as shown, the vibratory resilient member 1, the rotor 6 and the rotation output member 7 are formed with substantially the same diameter, and the holding member 11 is formed so as to be substantially equal to or larger in diameter than the vibratory resilient member 1, the rotor 6 and the rotation output member 7, and the holding member 11 functions as a guard member when the motor body is to be kept in a case, not shown, or is to be assembled to an apparatus.

Although the vibratory resilient member 1, the rotor 6 and the rotation output member 7 are formed with substantially the same diameter, these may differ in diameter from one another, and in such case, the diameter of the holding member may be made equal to or larger than the greatest one of the diameters of these parts.

Figure 7A:
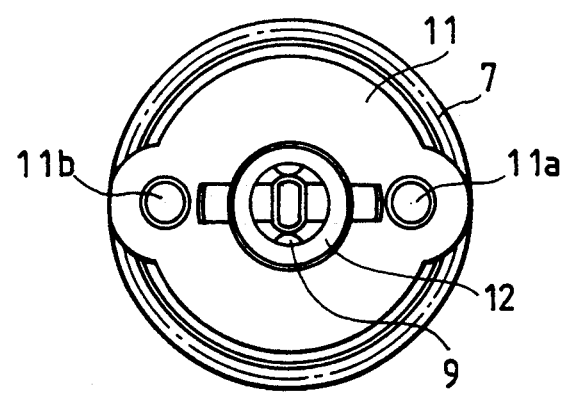
FIGS. 7A and 7B are a plan view and a cross-sectional view, respectively, of another embodiment of the present invention.
Figure 7B:
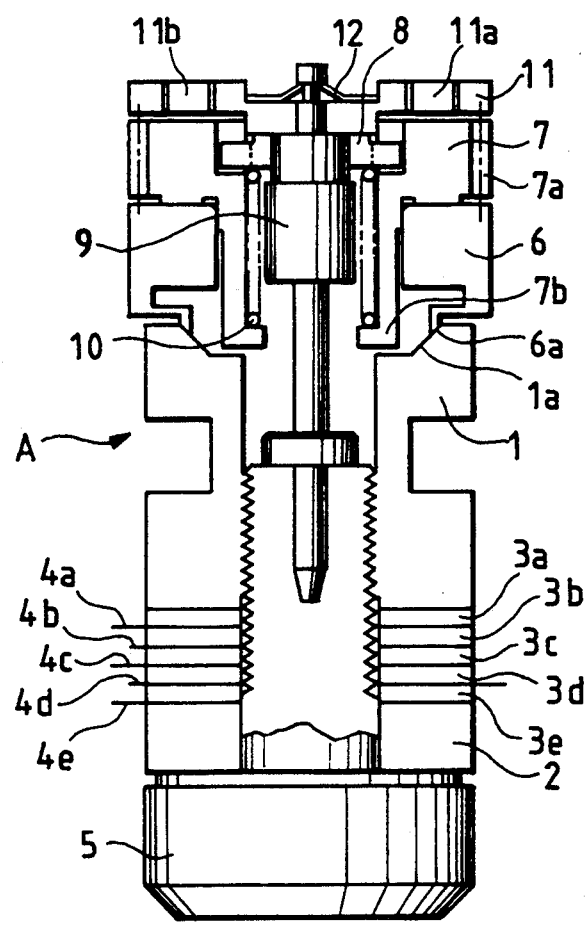

FIG. 7 shows an embodiment of the vibration driven motor according to the present invention, FIG. 7A being a plan view thereof, and FIG. 7B being a vertical cross-sectional view thereof.

The reference numeral 1 designates a pillar-shaped vibratory resilient member, the reference numeral 2 denotes a keep member formed of a metallic material and having an outer diameter equal to the outer diameter of the vibratory resilient member 1, the reference characters 3a–3e designate circular ring-shaped piezoelectric element plates formed with an outer diameter equal to the outer diameter of the vibratory resilient member 1, and the reference characters 4a–4e denote the electrode plates of the piezoelectric element plates 3a–3e. The electrode plates 4a–4e and the piezoelectric element plates 3a–3e are alternately disposed as shown between the vibratory resilient member 1 and the keep member 2, and a bolt 5 is threadably engaged with the vibratory resilient member 1 through the keep member 2, whereby these are integrally fixed to constitute the stator of the vibration driven motor A.

The vibration driven motor A is such that AC voltages differing in phase from one another are applied from a power source circuit, not shown, to the electrode plates 4a–4e of the stator, whereby the piezoelectric element plates 3a–3e form mechanical vibrations in the stator, and by a combination of these vibrations, a motion like rope skipping is excited in the stator to frictionally drive a rotor 6 to be described which is in frictional contact with the fore end portion of the stator.

The rotor 6 has its rear end portion (frictional contact portion) 6a bearing against the tapered portion 1a of the vibratory resilient member 1, and obtains an appropriate frictional force by the pressing by a pressing spring 10 which will be described later. The reference numeral 7 denotes a rotation output member formed of a friction stabilizing material and having a gear 7a, and is friction-coupled between the rear end surface thereof and the end surface of the rotor 6. The gear 7a is for transmitting the rotation of the rotor 6 to the outside.

The frictional force of the friction coupling between the rotor 6 and the rotation output member 7 is created by the pressing spring 10, and that force is set so as to be smaller than the frictional force between the vibratory resilient member 1 and the rotor 6 (so that the coefficient of friction may be small). That is, even if a rotational force is given from the outside to the rotation output member 7, the rotor 6 will not rotate. Rather, only the rotation output member 7 will rotate because the frictional force to the stator is greater than the frictional force to the rotation output member 7.

On the other hand, a rotation output bearing member 8 of a low friction material such as resin integrally movable relative to the rotation output member 7 in the direction of rotation and having a degree of freedom in the thrust direction is provided in the bore portion of the rotation output member 7, and this rotation output bearing member 8 is rotatably fitted on a shaft 9. Shaft 9 is forced into the bolt 5 and made integral with the bolt 5. The pressing spring 10 is designed to press the flange portion 7b of the rotation output member 7 and create a frictional force between the vibratory resilient member 1 and the rotor 6 and between the rotor 6 and the rotation output member 7 by the pressing force of the pressing spring. The pressing spring 10 presses the rotation output bearing member 8 to bring this rotation output bearing member 8 into pressure contact with a planar holding member 11, thereby holding the pressing force of the pressing spring 10.

The frictional force of the portion of pressure contact between the rotation output bearing member 8 and the holding member 11 is set to a value smaller than the frictional force between the rotation output member 7 and the rotor 6. That is, the relation among the frictional force $F_1$ between the rotation output bearing member 8 and the holding member 11, the frictional force $F_2$ between the rotation output member 7 and the rotor 6, and the frictional force $F_3$ between the rotor 6 and the vibratory resilient member 1 is set so that $F_1 < F_2 < F_3$. The holding member 11 is set against slippage relative to the shaft 9 by a push nut 12, and is stopped from rotating relative to the shaft 9 by a detent mechanism against the shaft 9. This vibration driven motor A is fixed by fixing the holding member 11 to a fixed member, not shown, by screws, not shown, through screw holes 11a and 11b.

The operation of the vibration driven motor A will now be described.

When AC voltages are applied to the electrode plates 4a–4e, the piezoelectric element plates 3a–3e are vibrated and thus, the rotor 6 is rotated in a predetermined direction through the vibratory resilient member 1. The direction of this rotation is determined by reversing, for example, the advance of the phases of the applied two AC voltages differing in phase from each other.

The rotation of the rotor 6 causes the rotation of the rotation output member 7 frictionally coupled to the rotor 6. At that time, the rotation output bearing member 8 is also rotated with the rotation output member 7, but as previously described, by the balance between the frictional forces, it slides and rotates between the holding member 11 and the rotation output bearing member 8 and therefore, no slippage takes place between the rotation output member 7 and the rotor 6 and the rotational force of the rotor 6 can be transmitted to the outside by the gear portion 7a of the rotation output member 7. With the rotation of the rotation output member 7, the pressing spring 10 is also rotated, but the pressing spring 10 is of such structure that it only presses in the thrust direction and transmits the rotation without the intermediary of the pressing spring 10 and therefore, the rotation of the rotation output member 7 is effected smoothly without being subjected to the torsion, distortion, flexure, chatter, etc. of the pressing spring 10 for the rotation of the rotation output member 7.

Also, when a high load is applied to the rotation output member 7, the rotor 6 begins to slide relative to the rotation output member 7 before the rotation of the rotor 6 becomes unstable or stops, and thus, the high load from the rotation output member 7 is not transmitted between the rotor 6 and the stator.

Figure 8A:
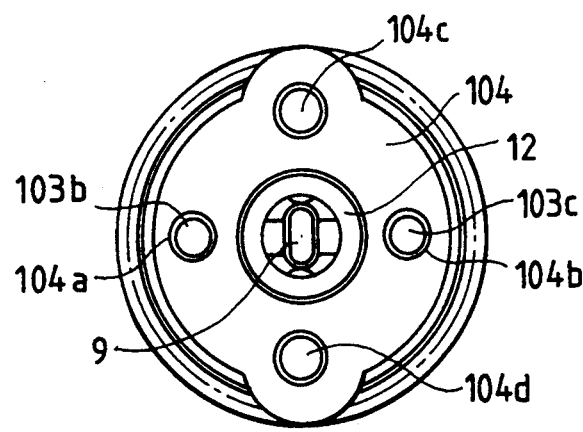
FIGS. 8A and 8B are a plan view and a cross-sectional view, respectively, of another embodiment of the present invention.
Figure 8B:
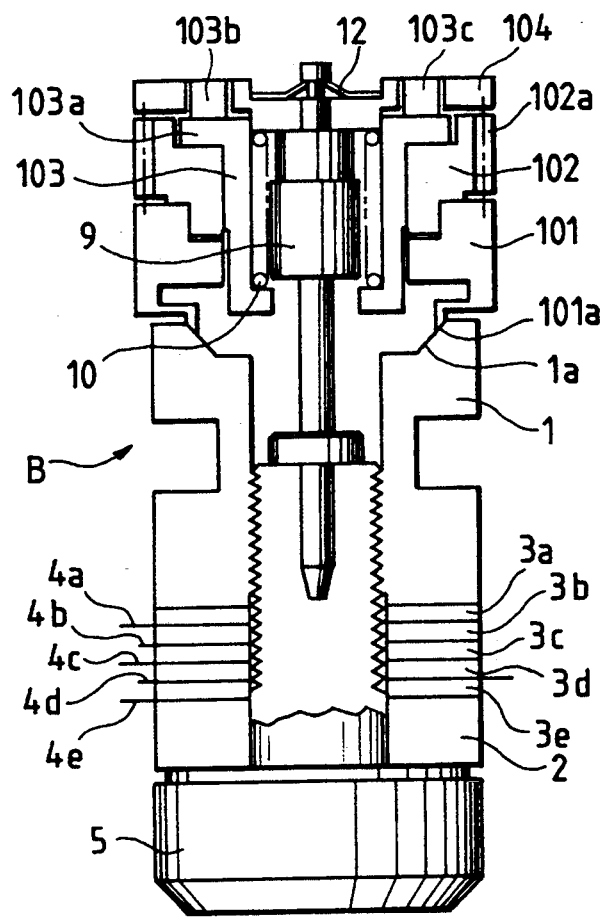

FIG. 8 shows another embodiment. In FIG. 8, members similar to those shown in FIG. 7 are given similar reference characters and need not be described.

The reference numeral 101 designates a rotor having its rear end portion (frictional contact portion) bearing against the tapered portion 1a of the vibratory resilient member 1 to obtain an appropriate friction force with respect to the vibratory resilient member 1 by the pressing-by the pressing spring 10. The reference numeral 102 denotes a rotation output member made of a friction stabilizing material and having a gear 102a and is friction-coupled between the rear end portion thereof and the end surface of the rotor 101. The gear 102a is for transmitting the rotation of the rotor 101 to the outside.

The frictional force of the friction coupling between the rotor 101 and the rotation output member 102 is created by the pressing spring 10, and that force is set so as to be smaller than the frictional force between the vibratory resilient member 1 and the rotor 101 (so that the coefficient of friction may be small). That is, even if a rotational force is given from the outside to the rotation output member 102, the rotor 101 will not rotate. Rather only the rotation output member 102 will rotate because the frictional force to the stator (the vibratory resilient member 1) is greater than the frictional force to the rotation output member 102.

On the other hand, a rotation output bearing member 103 of a low friction material such as resin is provided in the bore portion of the rotation output member 102, and this rotation output bearing member 103 is friction-coupled between the end surface of the flange portion 103a thereof and the end surface of the rotation output member 102. The frictional force of the friction coupling between the rotation output member 102 and the rotation output bearing member 103 is created by the pressing force 10, and that force is set so as to be smaller than the frictional force between the rotor 101 and the rotation output member 102.

That is, the relation among the frictional force $F_1$ between the rotation output bearing member 103 and the rotation output member 102, the frictional force $F_2$ between the rotation output member 102 and the rotor 101, and the frictional force $F_3$ between the rotor 101 and the vibratory resilient member 1 is set so that $F_1 < F_2 < F_3$. The rotation output bearing member 103 is provided with pin portions 103b and 103c, which are fitted in apertures 104a and 104b in the holding member 104, whereby the rotation output bearing member 103 is disposed so as to be locked with respect to the direction of rotation and to have a degree of freedom with respect to the thrust direction. Thus, the frictional forces $F_1$, $F_2$ and $F_3$ are created by the pressing spring 10. The holding member 104 is set against slippage relative to the shaft 9 by the push nut 12, and is stopped from rotating relative to the shaft 9 by the detent mechanism against the shaft 9. This vibration driven motor B is fixed by fixing the holding member 104 to a fixed member, not shown, by screws, not shown, through screw holes 104c and 104d. Also, as in FIG. 7, the output of the vibration driven motor B is transmitted to the outside by the gear portion 102a of the rotation output member 102.

The operation of the vibration driven motor B will now be described.

When AC voltages are applied to the electrode plates 4a–4e, the piezoelectric element plates 3a–3e are vibrated and thus, the rotor 101 is rotated in a predetermined direction through the vibratory resilient member 1 (the direction of this rotation is determined by reversing, for example, the advance of the phases of the applied two AC voltages differing in phase from each other). The rotation of the rotor 101 causes the rotation of the rotation output member 102 friction-coupled to the rotor 101. At that time, as previously described, by the balance between the frictional forces, it slides and rotates between the rotation output bearing member 103 and the rotation output member 102 and therefore, no slippage takes place between the rotation output member 102 and the rotor 101 and the rotational force of the rotor 101 can be transmitted to the outside by the gear portion 102a of the rotation output member 102. The pressing spring 10 is of such structure that it only presses in the thrust direction and transmits the rotation without the intermediary of the pressing spring 10 and therefore, the rotation of the rotation output member 102 is effected smoothly without being subjected to the torsion, distortion, flexure, chatter, etc. of the pressing spring 10 for the rotation of the rotation output member 102.

As in the embodiment shown in FIG. 7, when a high load is applied to the rotation output member 102, the rotor 101 begins to slide relative to the rotation output member 102 before the rotation of the rotor 101 becomes unstable or stops, and thus, the high load from the rotation output member 102 is not transmitted between the rotor 101 and the stator.

As described above, according to the present invention, even if a high load is applied to a rotation output member such as a gear, a rotatable member such as a rotor begins to slide relative to the rotation output member before the rotation of the rotatable member becomes unstable or stops, whereby the creation of abnormal abrasion and abnormal sound between the vibration member and the rotatable member can be prevented.

Also, according to the above-described embodiments, the frictional driving to the rotatable member is effected by the rotation output member itself and therefore, it is unnecessary to newly provide a part and thus, there can be provided a vibration driven motor which is inexpensive and is not increased in space but can contribute to compactness.

Also, if members constituting the motor including the friction mechanism are assembled as a unit, it will become unnecessary to provide a mechanism as a countermeasure for high load in any other portion than the motor, for example, a transmission system for driving the driven portion, as in the prior art, and the degree of freedom of the application to various apparatuses will greatly increase, and the effect thereof is great.

I claim:

1. A system provided with a vibration driven actuator as a drive source, the system comprising:
   a vibration member for generating a vibration therein in response to an applied electrical signal;
   a contact member frictionally engaged with said vibration member, said vibration causing relative movement between the vibration member and the contact member; and
   an output member frictionally engaged with one of said vibration member and said contact member, such that, during operation, a frictional engagement force between said vibration member and said contact member is greater than a frictional engagement force between said output member and said one member engaged with said output member.

2. A system according to claim 1, wherein said output member is frictionally engaged with said contact member.

3. A system according to claim 1, wherein said contact member is rotatable.

4. A system according to claim 2, wherein said frictional engagement force between said contact member and said output member is determined by a pressure member which provides said frictional engagement force between said contact member and said vibration member.

5. A vibration driven actuator comprising:
   a vibration member for generating a vibration therein in response to an applied electrical signal;
   a contact member frictionally engaged with said vibration member, said vibration causing relative movement between the vibration member and the contact member; and
   an output member frictionally engaged with one of said vibration member and said contact member, such that, during operation, a frictional engagement force between said vibration member and said contact member is greater than a frictional engagement force between said output member and said one member engaged with said output member.

6. A vibration driven actuator according to claim 5, wherein said output member is frictionally engaged with said contact member.

7. A vibration driven actuator according to claim 5, wherein said contact member is rotatable.

8. A vibration driven motor comprising:
   a vibration member;
   a first electro-mechanical energy conversion member functionally coupled to said vibration member for generating a first bending vibration having a first direction in said vibration member in response to a first applied electrical signal;
   a second electro-mechanical energy conversion member located with a spatial phase difference with respect to said first energy conversion member and functionally coupled to said vibration member for generating a second bending vibration having a second direction different from said first bending vibration in response to a second applied electrical signal, whereby a combined vibration of the first bending vibration and the second bending vibration is generated in said vibration member;
   a contact member frictionally contacted to said vibration member, whereby said combined vibration causes relative movement between said vibration member and said contact member; and
   an output member frictionally engaged with one of said vibration member and said contact member, such that, during operation, a frictional engagement force between said vibration member and said contact member is greater than a frictional engagement force between said output member and said one member engaged with said output member.

9. A system provided with a vibration driven actuator as a drive source, the system comprising:
   a vibration member for generating a vibration therein in response to an applied electrical signal;
   a contact member frictionally engaged with said vibration member, said vibration causing relative movement between the vibration member and the contact member; and
   an output member frictionally engaged with one of said vibration member and said contact member;
   wherein said vibration member, said contact member and said output member are arranged such that, during operation, a frictional engagement force between said vibration member and said contact member is greater than a frictional engagement force between said output member and said one member engaged with said output member.

10. A vibration driven actuator comprising:

a vibration member for generating a vibration therein in response to an applied electrical signal;

a contact member frictionally engaged with said vibration member, said vibration causing relative movement between the vibration member and the contact member; and an output member frictionally engaged with one of said vibration member and said contact member;

wherein said vibration member, said contact member and said output member are arranged such that, during operation, a frictional engagement force between said vibration member and said contact member is greater than a frictional engagement force between said output member and said one member engaged with said output member.

11. A vibration driven motor comprising:

a vibration member;

a first electro-mechanical energy conversion member functionally coupled to said vibration member for generating a first bending vibration having a first direction in said vibration member in response to a first applied electrical signal;

a second electro-mechanical energy conversion member located with a spatial phase difference with respect to said first energy conversion member and functionally coupled to said vibration member for generating a second bending vibration having a second direction different from said first bending vibration in response to a second applied electrical signal, whereby a combined vibration of the first bending vibration and the second bending vibration is generated in said vibration member;

a contact member frictionally contacted to said vibration member, whereby said combined vibration causes relative movement between said vibration member and said contact member; and an output member frictionally engaged with one of said vibration member and said contact member;

wherein said vibration member, said contact member and said output member are arranged such that, during operation, a frictional engagement force between said vibration member and said contact member is greater than a frictional engagement force between said output member and said one member engaged with said output member.

\* \* \* \* \*

UNITED STATES PATENT AND TRADEMARK OFFICE
CERTIFICATE OF CORRECTION

PATENT NO. : 5,428,260
DATED : June 27, 1995
INVENTOR(S) : RYUJI SUZUKI

It is certified that error appears in the above-indentified patent and that said Letters Patent is hereby corrected as shown below: On title page,

<u>At [56] Foreign Patent Documents</u>

"297281 4/1990 Japan" should read --2-97281 4/1990 Japan--.

<u>Column 2</u>

Line 8, "provided" should read --is provided--.

Signed and Sealed this

Seventh Day of November, 1995

Attest:

BRUCE LEHMAN

*Attesting Officer*   *Commissioner of Patents and Trademarks*